US008588308B2

(12) United States Patent
Ziauddin et al.

(10) Patent No.: US 8,588,308 B2
(45) Date of Patent: Nov. 19, 2013

(54) METHOD AND APPARATUS FOR LOW COMPLEXITY VIDEO ENCODING AND DECODING

(75) Inventors: Syed Muhammad Ziauddin, Islamabad (PK); Imran ul Haq, Islamabad (PK); Mohammad Ayub Khan, Santa Clara, CA (US)

(73) Assignee: Streaming Networks (Pvt.) Ltd., Santa Clara, CA (US)

( * ) Notice: Subject to any disclaimer, the term of this patent is extended or adjusted under 35 U.S.C. 154(b) by 0 days.

(21) Appl. No.: 13/481,913

(22) Filed: May 28, 2012

(65) Prior Publication Data

US 2012/0294367 A1    Nov. 22, 2012

Related U.S. Application Data

(63) Continuation-in-part of application No. 11/677,982, filed on Feb. 22, 2007, now abandoned.

(51) Int. Cl.
*H04L 29/06* (2006.01)
(52) U.S. Cl.
USPC ......... 375/240.16; 375/E07.125; 375/E07.25; 375/E07.256; 375/240.01; 375/E07.26; 382/276; 348/398.1
(58) Field of Classification Search
USPC ...................... 375/240.16, E07.125, E07.256; 348/398.1; 382/276
See application file for complete search history.

(56) References Cited

U.S. PATENT DOCUMENTS

| 6,845,179 | B1* | 1/2005 | Sadjadian et al. | 382/236 |
| 2002/0041699 | A1* | 4/2002 | Kim | 382/107 |
| 2006/0146187 | A1* | 7/2006 | Handjojo et al. | 348/448 |

OTHER PUBLICATIONS

Wiegand et al; "Overview of the H.264/AVC Video coding standard"—IEEE transactions on circuits and systems for video technology, vol. 13, No. 7, Jul. 2003.*

* cited by examiner

*Primary Examiner* — Taghi Arani
*Assistant Examiner* — Jason Lee
(74) *Attorney, Agent, or Firm* — Firasat Ali Creso Legal

(57) ABSTRACT

This disclosure describes unique video encoding and decoding processes compliant to one or more specific coding standards, such as the H.264/AVC standard, without sacrificing coding efficiency. A higher resolution input image is divided into a corresponding set of lower resolution sub-sampled images. The first image of each set is coded as an independent I picture, or coded with respect to the first image of one or more other sets as a P or B picture. Each subsequent image of a set, other than the first image in each set, is encoded with respect to the first image of the same set or an image of another set as a regular P or B picture. A decoding process may employ a decoder conforming to the specific coding standard to decode the encoded data, by rearranging the decoded lower resolution sub-sampled images of each set into corresponding higher resolution output images.

21 Claims, 20 Drawing Sheets

| 0 | 1 | 0 | 1 | 0 | 1 | 0 | 1 | 0 | 1 | 0 | 1 | 0 | 1 | 0 | 1 |
|---|---|---|---|---|---|---|---|---|---|---|---|---|---|---|---|
| 2 | 3 | 2 | 3 | 2 | 3 | 2 | 3 | 2 | 3 | 2 | 3 | 2 | 3 | 2 | 3 |
| 0 | 1 | 0 | 1 | 0 | 1 | 0 | 1 | 0 | 1 | 0 | 1 | 0 | 1 | 0 | 1 |
| 2 | 3 | 2 | 3 | 2 | 3 | 2 | 3 | 2 | 3 | 2 | 3 | 2 | 3 | 2 | 3 |
| 0 | 1 | 0 | 1 | 0 | 1 | 0 | 1 | 0 | 1 | 0 | 1 | 0 | 1 | 0 | 1 |
| 2 | 3 | 2 | 3 | 2 | 3 | 2 | 3 | 2 | 3 | 2 | 3 | 2 | 3 | 2 | 3 |
| 0 | 1 | 0 | 1 | 0 | 1 | 0 | 1 | 0 | 1 | 0 | 1 | 0 | 1 | 0 | 1 |
| 2 | 3 | 2 | 3 | 2 | 3 | 2 | 3 | 2 | 3 | 2 | 3 | 2 | 3 | 2 | 3 |
| 0 | 1 | 0 | 1 | 0 | 1 | 0 | 1 | 0 | 1 | 0 | 1 | 0 | 1 | 0 | 1 |
| 2 | 3 | 2 | 3 | 2 | 3 | 2 | 3 | 2 | 3 | 2 | 3 | 2 | 3 | 2 | 3 |
| 0 | 1 | 0 | 1 | 0 | 1 | 0 | 1 | 0 | 1 | 0 | 1 | 0 | 1 | 0 | 1 |
| 2 | 3 | 2 | 3 | 2 | 3 | 2 | 3 | 2 | 3 | 2 | 3 | 2 | 3 | 2 | 3 |
| 0 | 1 | 0 | 1 | 0 | 1 | 0 | 1 | 0 | 1 | 0 | 1 | 0 | 1 | 0 | 1 |
| 2 | 3 | 2 | 3 | 2 | 3 | 2 | 3 | 2 | 3 | 2 | 3 | 2 | 3 | 2 | 3 |
| 0 | 1 | 0 | 1 | 0 | 1 | 0 | 1 | 0 | 1 | 0 | 1 | 0 | 1 | 0 | 1 |
| 2 | 3 | 2 | 3 | 2 | 3 | 2 | 3 | 2 | 3 | 2 | 3 | 2 | 3 | 2 | 3 |

| 0 | 1 | 0 | 1 | 0 | 1 | 0 | 1 | 0 | 1 | 0 | 1 | 0 | 1 | 0 | 1 |
|---|---|---|---|---|---|---|---|---|---|---|---|---|---|---|---|
| 2 | 3 | 2 | 3 | 2 | 3 | 2 | 3 | 2 | 3 | 2 | 3 | 2 | 3 | 2 | 3 |
| 0 | 1 | 0 | 1 | 0 | 1 | 0 | 1 | 0 | 1 | 0 | 1 | 0 | 1 | 0 | 1 |
| 2 | 3 | 2 | 3 | 2 | 3 | 2 | 3 | 2 | 3 | 2 | 3 | 2 | 3 | 2 | 3 |
| 0 | 1 | 0 | 1 | 0 | 1 | 0 | 1 | 0 | 1 | 0 | 1 | 0 | 1 | 0 | 1 |
| 2 | 3 | 2 | 3 | 2 | 3 | 2 | 3 | 2 | 3 | 2 | 3 | 2 | 3 | 2 | 3 |
| 0 | 1 | 0 | 1 | 0 | 1 | 0 | 1 | 0 | 1 | 0 | 1 | 0 | 1 | 0 | 1 |
| 2 | 3 | 2 | 3 | 2 | 3 | 2 | 3 | 2 | 3 | 2 | 3 | 2 | 3 | 2 | 3 |
| 0 | 1 | 0 | 1 | 0 | 1 | 0 | 1 | 0 | 1 | 0 | 1 | 0 | 1 | 0 | 1 |
| 2 | 3 | 2 | 3 | 2 | 3 | 2 | 3 | 2 | 3 | 2 | 3 | 2 | 3 | 2 | 3 |
| 0 | 1 | 0 | 1 | 0 | 1 | 0 | 1 | 0 | 1 | 0 | 1 | 0 | 1 | 0 | 1 |
| 2 | 3 | 2 | 3 | 2 | 3 | 2 | 3 | 2 | 3 | 2 | 3 | 2 | 3 | 2 | 3 |
| 0 | 1 | 0 | 1 | 0 | 1 | 0 | 1 | 0 | 1 | 0 | 1 | 0 | 1 | 0 | 1 |
| 2 | 3 | 2 | 3 | 2 | 3 | 2 | 3 | 2 | 3 | 2 | 3 | 2 | 3 | 2 | 3 |

FIG. 6

METHOD AND APPARATUS FOR LOW COMPLEXITY VIDEO ENCODING AND DECODING

PRIORITY CLAIMED

The present application is a continuation in part of the parent application having application Ser. No. 11/677,982 filed on Feb. 22, 2007.

FIELD OF THE DISCLOSURE

The present disclosure generally relates to video encoding and decoding, and more specifically, to reduction of computational complexity for encoding and decoding compliant to one or more standards, through efficient predictive coding.

BACKGROUND OF THE DISCLOSURE

The demand to incorporate video data in numerous transmission and storage systems, and the desire to improve the quality of video in such systems, have prompted rapid advancement in digital video compression techniques. Compression of digital video without significant degradation in quality is possible because of the high degree of spatial, temporal, and spectral redundancy in video sequences. Video encoders exploit the spatial, temporal, and spectral correlations in un-compressed video data to generate compressed video streams through complex predictive coding techniques.

During the past decade, a number of ISO/ITU/SMPTE video coding standards targeting the vast range of video applications have evolved. These standards include H.261, MPEG1, MPEG2, H.263, MPEG4, VC-1, and AVC/H.264. Each new video coding standard improves the coding efficiency of its predecessor by introducing more complex and efficient prediction and estimation tools. The coding efficacy of video coding algorithms and the computational load have therefore risen sharply.

The issue of computational complexity becomes more significant with the arrival of the H.264/AVC (ISO/IEC 14496-10) video coding standard, as such standard offers more coding options comparing to the previous standards. The H.264/AVC standard delivers higher compression efficiency relative to the earlier standards but at the cost of higher computational load. The higher computational load is evident from the comprehensive set of video coding tools that the H.264/AVC standard provides. The tools include multiple prediction block sizes for Intra (I), Predicted (P), and Bi-directionally predicted (B) type pictures, multiple short-term and long-term reference frames for P and B type pictures, multiple hypothesis prediction modes, generalized B images that can act as predictors for other B images, Arithmetic coding and in-loop deblocking. In order to encode a video frame, an encoder has to select between numerous Inter and Intra macroblock prediction modes to obtain the optimum encoding mode. Such a selection process is time-consuming but vital to achieve the compression performance provided by the H.264/AVC standard.

The high computational complexity of the H.264/AVC standard presents a major hurdle in the implementation of H.264/AVC compliant encoders and decoders, particularly in real-time resource constrained environments. This can be appreciated from the fact that encoders generating H.264/AVC compliant streams are generally four to five times computationally more demanding than MPEG2. This fact is significant in consumer electronics where the success of a system depends largely on its cost competitiveness, and where digital signal processors (DSPs) and other devices having low or limited computing power are frequently used. The emergence of high definition television (HDTV) has raised the stakes further by increasing the computational demand several folds. H.264/AVC offers multiple spatial prediction modes of blocks from neighboring blocks. However, the prediction model is cumbersome and less effective for high textured images.

In order to help deploy low cost systems, there is a need for methods and systems that are capable of reducing the computational complexity of encoders and decoders compliant to a specific standard, such as H.264/AVC, without compromising coding efficiency. There is also a need for video coding and decoding techniques that can reduce the computational complexity without massive changes in the embedded prediction algorithms prescribed by video coding standards, such as H.264/AVC.

This disclosure describes unique techniques and embodiments of video coding and decoding that meet one or more above needs. According to one embodiment, a sub-sampled image prediction method is merged with a video coding/decoding standard, such as the H.264/AVC encoding process, in a unique way so that the generated compressed video bit streams remain compliant with H.264/AVC standard. In one aspect, the disclosure makes use of a multiple reference frames tool and the concept of generalized B images, as provided by the H.264/AVC standard, taking full advantage of H.264/AVC coding tools and also reaps the benefits of sub-sampled image prediction. A higher resolution input image is sub-sampled to form a set of lower resolution sub-sampled images. Utilizing the high degree of correlation among the sub-sampled images in a set, a motion compensated prediction of a sub-sampled image in a set is performed from another sub-sampled image in the set. Employing a multiple reference frame paradigm as provided by the H.264/AVC standard, the above prediction is compared with predictions from other sub-sampled images in the same set or in previously coded sets, and the best predictors are used to code a slice or macroblock of the current sub-sampled image.

In one aspect, an exemplary encoding process according to this disclosure divides a higher resolution input image into a corresponding set of lower resolution sub-sampled images, and feeds the sub-sampled images in appropriate order to a video encoder compliant with a specific video coding standard, such as the H.264/AVC standard. Each set of sub-sampled images corresponding to a higher resolution input image comprises a first sub-sampled image and subsequent sub-sampled images. In one embodiment, the video encoder is a H.264 encoder and encodes the first image of each set either as an independent I picture, or as a P or B picture, with respect to the first image(s) of other set(s); while any subsequent image of a set is coded with respect to the first image or a subsequent image of the same set, or an image of a previously coded set, as a regular P or B picture. All sub-sampled images of a set are coded either in Intra predictive coding format or in motion compensated Inter predictive coding format as prescribed by a video coding standard, such as the H.264/AVC standard. The compressed streams generated by the exemplary coding process can be decoded by a decoder conforming to the same video coding standard, such as the H.264/AVC standard. The amalgamation of sub-sampled image prediction with H.264 tools reduces the computational complexity of the encoding process.

In decoding the video streams generated by the exemplary encoding process of this disclosure, a decoder is utilized to rearrange the decoded lower resolution sub-sampled images of each set into corresponding higher resolution output images. The output images can be displayed or stored on appropriate devices.

According to another embodiment of this disclosure, an exemplary coding process utilizes a unique spatially scalable H.264 encoding paradigm that does not require up-scaling of the base layer for predictive encoding of the enhancement layer. In one embodiment, the first sub-sampled image of a set corresponding to each input image acts as the base layer, while the enhancement layer comprises all subsequent sub-sampled images of the set that are predicted from the base layer image and/or one or more enhancement layer images through motion compensated prediction. Without affecting the integrity of the video stream, the decoding process may choose to decode just the base layer, the base layer and some parts of the enhancement layer, or the base layer and the entire enhancement layer. According to yet another embodiment of this disclosure, an exemplary encoding and decoding process utilizes proprietary extensions to H.264 encoding and decoding processes for further improvement in coding efficacy. The encoding process may choose to enhance a reference sub-sampled image of a set prior to predicting other sub-sampled images through motion compensated prediction; thereby forming predictors with better quality. Enhancement may be carried out through any filtering or sharpening techniques. Moreover, in one aspect, the exemplary encoding process may utilize the high degree of correlation between the sub-sampled images of a set, and decide not to encode motion vector data of the motion vectors between two sub-sampled images of a set. The motion vector data can be easily created within the decoding process by considering the sub-sampling order. Furthermore, the exemplary encoding process may decide not to encode the motion vector data of the motion vectors between two sub-sampled images of two different sets, and instead reuse the motion vectors between two previously coded sub-sampled frames of the same sets.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below. The drawing figures depicted herein are by way of example only, not by way of limitation. In the figures, like reference numerals refer to the same or similar elements.

BRIEF DESCRIPTION OF THE DRAWINGS

FIG. 3 shows a component of a high-resolution image at the input of the image sub-sampling unit in the encoding process, having pixels marked according to a possible sub-sampling arrangement.

FIG. 4 shows a component of the high-resolution image of FIG. 3 divided into a possible set of lower resolution sub-sampled images, at the input of the H.264 encoder in the encoding process.

FIG. 5 depicts a set of decoded sub-sampled images of lower resolution at the output of the H.264 decoder in the decoding process, corresponding to a component of a high-resolution image.

FIG. 6 shows a component of a high-resolution image that is formed by rearranging a set of sub-sampled images in the re-arrangement unit in the decoding process.

DETAILED DESCRIPTION OF ILLUSTRATIVE EMBODIMENTS

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings. It is understood that although financial or market data is used for illustration example, any type of data could be distributed on a network implemented according to this disclosure.

Reference now is made in detail to the examples illustrated in the accompanying drawings and discussed below. Although the embodiments are exemplified by using the H.264/AVC standard, it is understood that the same concepts are applicable to other encoding standards.

According to a first embodiment of this disclosure, an exemplary encoding process sub-samples high-resolution input images, and merges motion compensated predictions between the resulting sub-sampled images with encoding tools of a specific video coding standard, such as the H.264/AVC standard, in a unique way so that the generated compressed video bit streams remain compliant with the unique coding standard. The exemplary encoding process makes effective use of one or more reference frames tool provided by the specific coding standard, such as the H.264 standard, whereby a video frame can be predicted by one or more previously decoded frames. Moreover, the exemplary encoding process utilizes the concept of generalized B images as introduced by the H.264 standard, whereby images can be referenced from previously coded B images. Consequently, the exemplary coding process takes full advantage of the efficiency of H.264/AVC coding tools and also reaps the benefits of the high degree of correlation among sub-sampled images.

Figure 1:
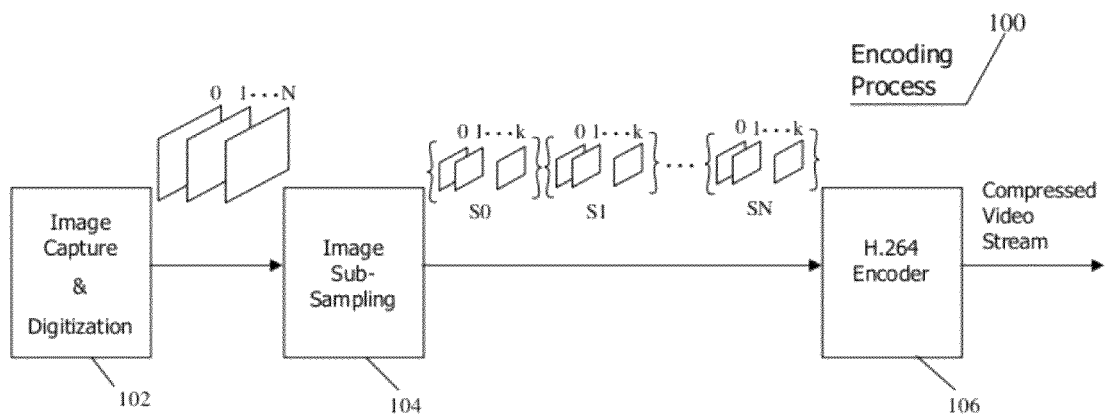
FIG. 1 is a simplified diagram showing an overview of the encoding process according to one embodiment of the present disclosure.

FIG. 1 is a simplified diagram showing an overview of an exemplary encoding process 100 according to one embodiment of the present disclosure. An Image capture and digitization device 102 is provided to convert analog video signals into digital images. The converted digital images are passed on to an Image sub-sampling unit 104 that divides an input image into a set of sub-sampled images having resolutions lower than the image input to the Image sub-sampling unit 104. Each set of the sub-sampled images corresponding to a higher resolution input image comprises a first sub-sampled image and subsequent sub-sampled images. The sets of sub-sampled images are fed to an H.264 encoder 106 where the sub-sampled images are coded as I, P, or B pictures. The compressed stream(s) generated by the encoder 106 can be decoded by a decoder conforming to the H.264/AVC standard.

Figure 2:
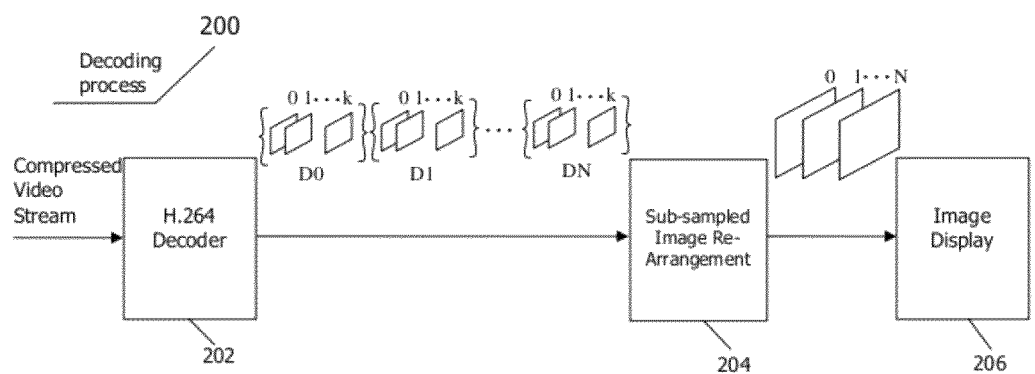
FIG. 2 depicts an overview of the decoding process according to one embodiment of the present disclosure.

FIG. 2 is a simplified diagram showing an overview of an exemplary decoding process 200 according to one embodiment of the present disclosure. A decoder 202 conforming to the H.264/AVC standard is provided to decode the video stream(s) generated by an exemplary encoding process according to this disclosure. The output of the decoder 202 is in the form of one or more sets of decoded sub-sampled images. The decoded set(s) of sub-sampled images are fed to an Image re-arrangement unit 204 that re-arranges the decoded sub-sampled images into higher resolution images for display by an image display device 206.

The image sub-sampling unit 104 and the re-arrangement unit 204 may be implemented by software or hardware or a combination thereof, and can exist as separate entities or may be parts of the encoder or the decoder, respectively. These units may also be part of the capture/digitization circuits or display devices, respectively. Moreover, the type (YCbCr, YUV, RGB, etc.) of images and the number of sub-sampled images in a set may vary in different embodiments of the disclosure and do not limit the scope of the disclosure.

Figure 4:
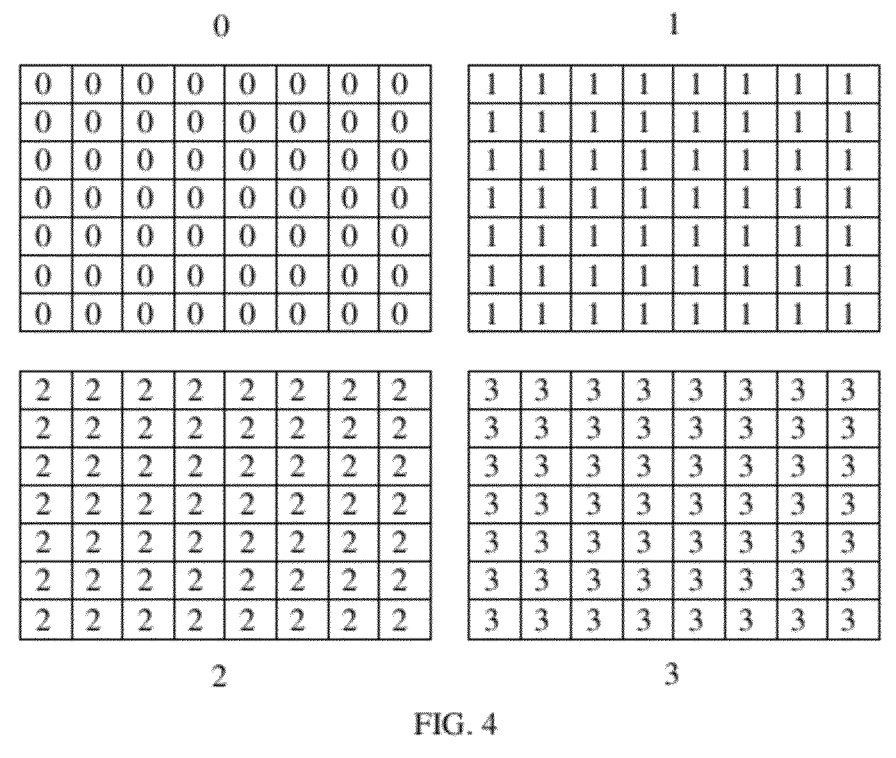

FIG. 3 depicts a component (out of the luminance or chrominance components) of a higher resolution image at the input of the image sub-sampling unit 104 used in the encoding process, which includes pixels marked according to one possible sub-sampling arrangement. Each luminance or chrominance component of an image undergoes a similar sub-sampling operation. The sub-sampled components of an image are stacked together to form a set of sub-sampled images. For example, in one embodiment, the input images and the sub-sampled images are in YCbCr format and each has three components. FIG. 4 shows a component of the higher resolution image of FIG. 3 divided into an exemplary set of lower resolution sub-sampled images, at the input of the H.264 encoder 106 in the encoding process.

Figure 5:
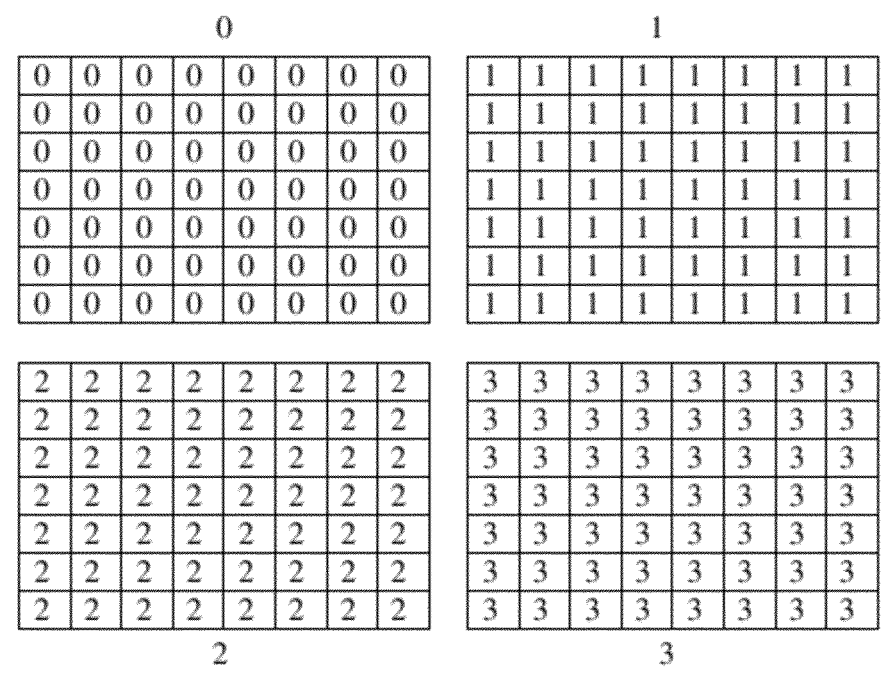

FIG. 5 and FIG. 6 illustrate an exemplary rearrangement procedure of the decoded sub-sampled images carried out in a decoding process, according to one embodiment of the present disclosure. The exemplary rearrangement process complements the sub-sampling process at the encoding end. FIG. 5 depicts a set of decoded sub-sampled images of lower resolution at the output of the H.264 decoder 202 in the decoding process shown in FIG. 2, corresponding to a component of a higher resolution image.

FIG. 6 illustrates a component of a higher resolution image that is formed by rearranging a set of sub-sampled images by the re-arrangement unit 204 shown in FIG. 2 in an exemplary decoding process of this disclosure. According to one embodiment, the output images of the rearrangement process are ready to be rendered or stored.

Figure 7:
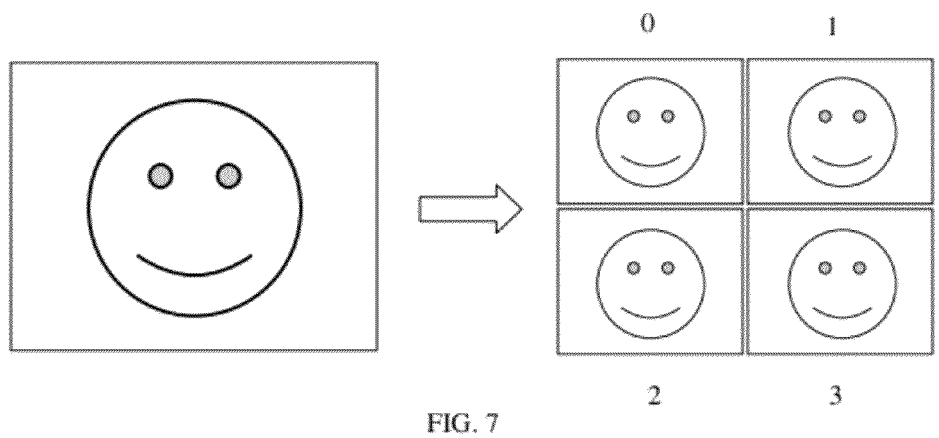
FIG. 7 is a graphic illustration of dividing a high resolution image into a set of four low resolution sub-sampled images, according to one embodiment of the present disclosure.
Figure 8:
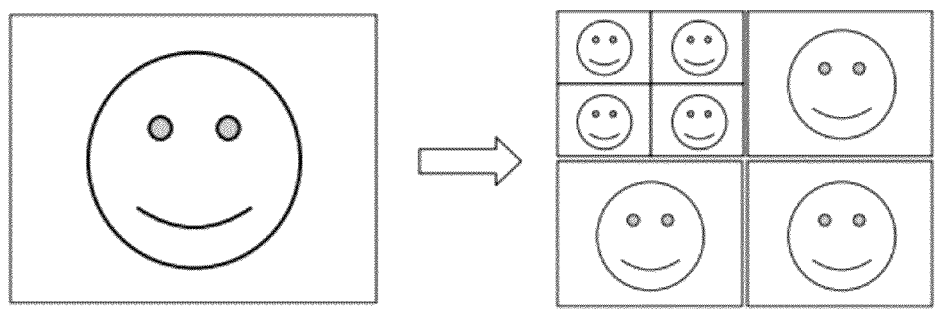
FIG. 8 is a graphic illustration of dividing a high resolution image into multiple layered lower resolution sub-sampled images, according to one embodiment of the present disclosure.

To further exemplify the concept of sub-sampling, FIG. 7 shows graphic illustration of dividing a higher resolution image into a set of four lower resolution sub-sampled images, according to one embodiment of the present disclosure. The nature or the order of the sub-sampling performed on the images does not limit the scope of the present disclosure. An input image may be divided into any number of sub-sampled images with same or different resolutions. The sub-sampled images may in turn be further sub-sampled to obtain a layered architecture. To exemplify these concepts, FIG. 8 shows a graphic illustration of dividing a component of a higher resolution image into multiple-layered lower resolution sub-sampled images, according to one embodiment of the present disclosure.

An exemplary encoder according to this disclosure may encode the sub-sampled images using various approaches. In one embodiment, an exemplary H.264 encoder encodes the first sub-sampled image of each set either as an independent I picture, or as a P or B picture that is motion compensated with respect to the first image(s) of other set(s) (inter-set prediction). According to another embodiment of the disclosure, an exemplary encoder encodes any subsequent image of a set as a P or B picture that is motion compensated with respect to an image of the same set (intra-set prediction) and/or with respect to an image of another set (inter-set prediction). According to still another embodiment of this disclosure, an exemplary encoder encodes all sub-sampled images of a set either in Intra predictive coding format or in motion compensated Inter predictive coding format as prescribed by H.264/AVC standard.

Figure 9:
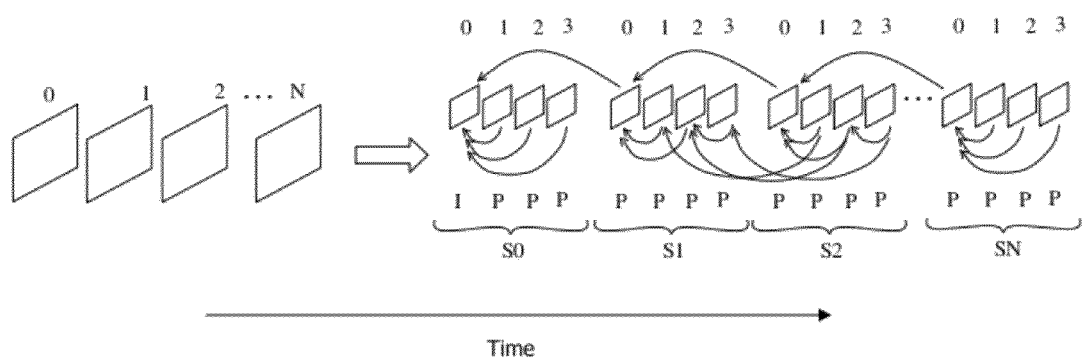
FIG. 9 shows an exemplary picture referencing process within and between sets of sub-sampled images in H.264-based IP encoding, according to one embodiment of the present disclosure.

FIG. 9 shows picture referencing process used in inter-set and intra-set predictions for sub-sampled images in an IP encoding scheme, according to one embodiment of the present disclosure. The direction of arrows in FIG. 9 indicate a frame from which predictions are made (reference frames)

when encoding a certain frame. It is apparent from FIG. 9 that the exemplary referencing process utilizes the flexibility offered by the H.264/AVC standard, and predicts a sub-sampled image not just from the immediately previous neighboring image, but from other previously coded frames as well. Moreover, the exemplary referencing process utilizes simultaneous references from multiple frames as prescribed by the H.264/AVC standard.

Figure 10:
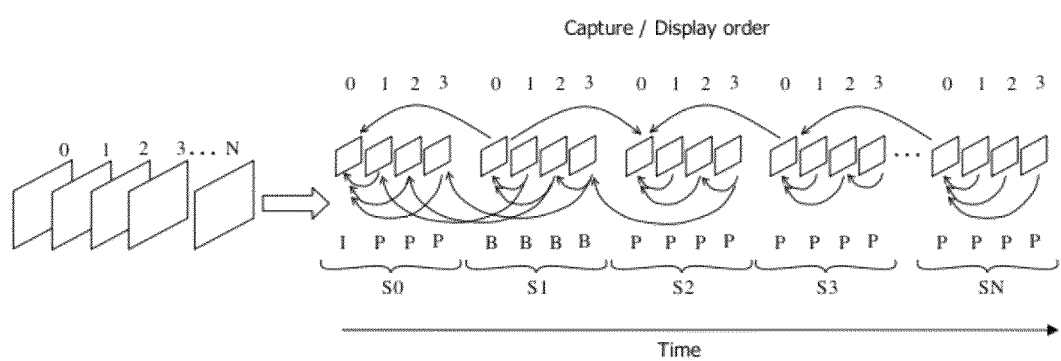
FIG. 10 shows an exemplary picture referencing process within and between sets of sub-sampled images in H.264-based IPB encoding, according to one embodiment of the present disclosure.

FIG. 10 shows an exemplary picture referencing process within and between sets of sub-sampled images in an IPB encoding scheme, according to one embodiment of the present disclosure. As shown in FIG. 10, the first B picture of a set is encoded bi-directionally from pictures of other sets (inter-set prediction), while the subsequent B pictures are encoded from a B picture of the same set (intra-set prediction), and/or with respect to a picture of another set (inter-set prediction). Again, the exemplary referencing process utilizes simultaneous references from multiple frames as prescribed by the H.264/AVC standard.

Figure 11:
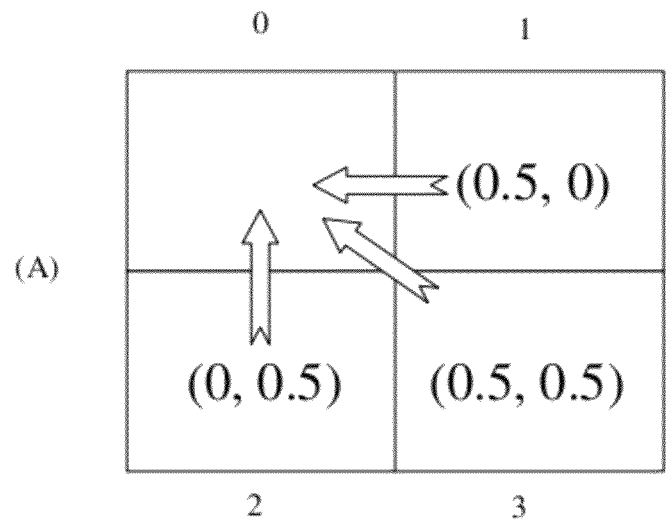
FIG. 11 is a graphic illustration of pre-determining motion vectors between sub-sampled images of a set, according to one embodiment of the present disclosure.
Figure 11:
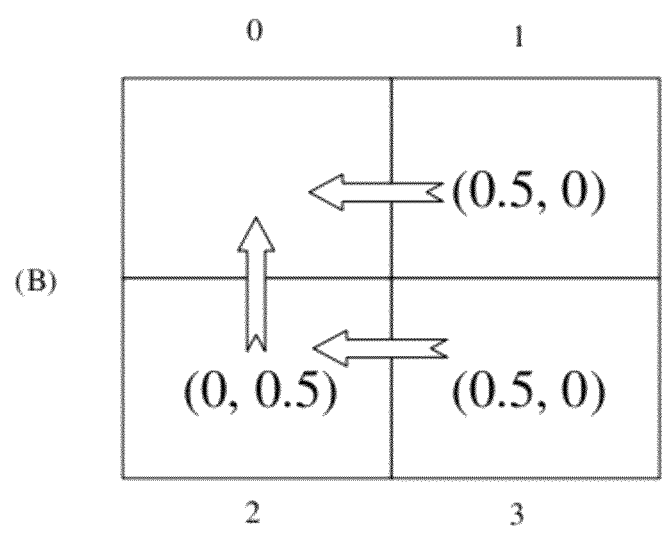

FIG. 11 is a graphic illustration of obtaining motion vectors between sub-sampled images of a set, according to one embodiment of the present disclosure, which greatly reduces the computational complexity of the encoding process by obtaining motion vectors for intra-set motion compensated prediction. Depending upon the nature and order of the sub-sampling process, the motion vectors between sub-sampled images of a set are pre-determined, and remain fixed. Different sub-sampling patterns and prediction directions yield different pre-defined motion vectors. In one embodiment of the present disclosure the pre-determined motion vectors have at least one non-zero vector component. As illustrated in FIG. 11(A), if an image is sub-sampled into a set of four images, then due to the regularity of the sub-sampling pattern, the optimum motion vectors of the three subsequent sub-sampled images with respect to the first sub-sampled image are merely (0.5, 0), (0, 0.5), or (0.5, 0.5). Likewise, as illustrated in FIG. 11(B), if for the same set of four images the prediction direction is changed so that the fourth sub-sampled image is predicted from the third sub-sampled image rather than the first, then the optimum motion vectors of the three sub-sampled images are (0.5, 0), (0, 0.5), or (0.5, 0). Thus, the optimum intra-set motion vectors having at least one non-zero vector component are determined before hand, and the computations involved in the motion estimation process can be bypassed for intra-set predictions. It is understood that an encoder according to this disclosure may still utilize a motion estimator for obtaining intra-set predictions.

Figure 12:
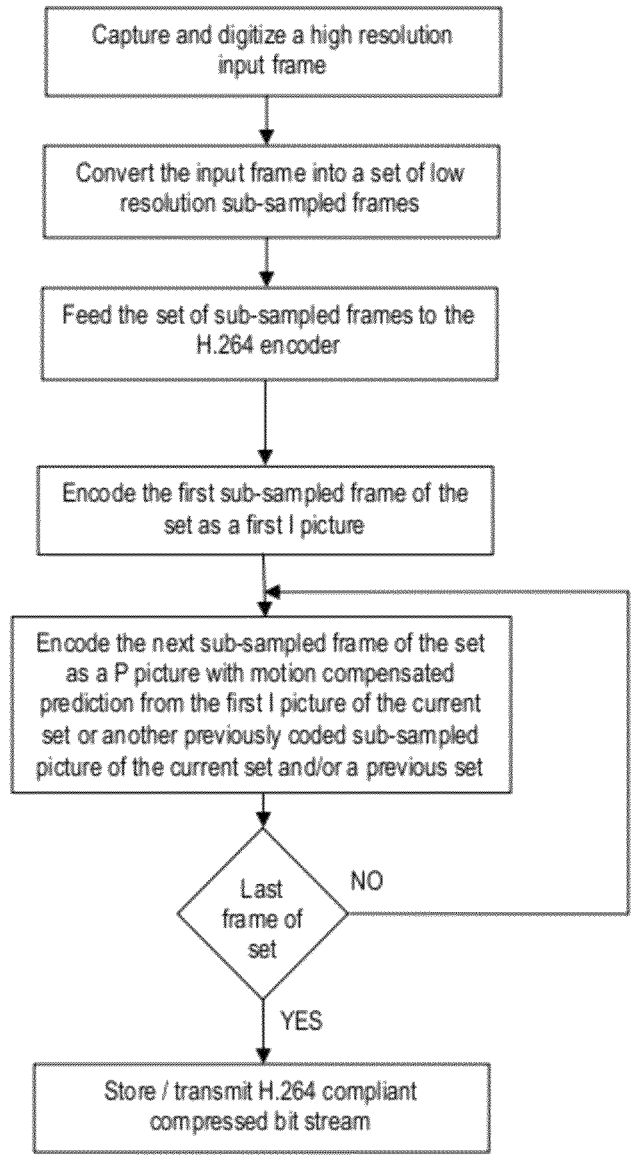
FIG. 12 is a simplified flow diagram showing I picture encoding in a H.264 encoder, according to one embodiment of the present disclosure.

FIG. 12 shows a simplified flow chart illustrating an exemplified I picture encoding procedure performed by an encoder, according to one embodiment of the present disclosure. An input frame is captured and digitized into a YUV frame, YCbCr frame, or a frame of any other suitable format. Each component of the input frame is sub-sampled, and corresponding sub-sampled frame-components are combined to form a set of lower-resolution sub-sampled frames. The sub-sampled frames are fed to an encoder. The encoder encodes the first sub-sampled frame of the set as a first I picture, and encodes the rest of the sub-sampled frames as P pictures using motion compensated prediction with respect to the first I picture of the current set or a previously coded sub-sampled picture of the current set and/or a previous set. In one embodiment, the first and the subsequent sub-sampled frames are encoded according to the H.264/AVC standard.

Figure 13:
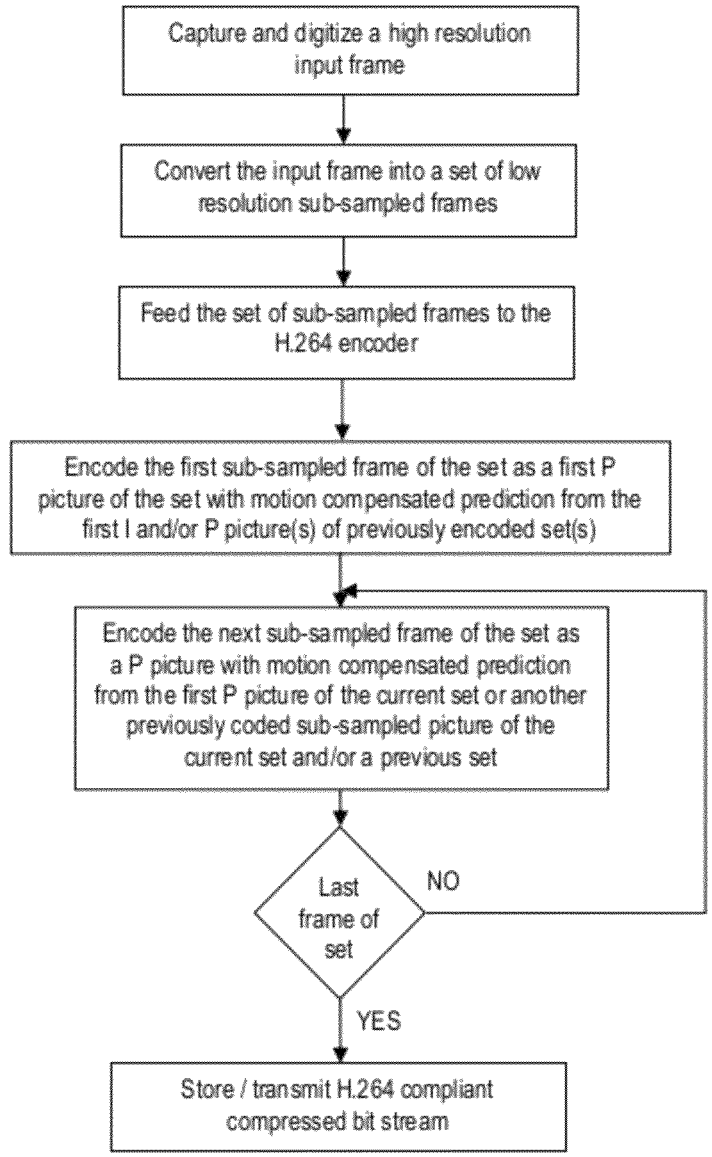
FIG. 13 depicts a simplified flow chart showing P picture encoding in a H.264 encoder, according to one embodiment of the present disclosure.

FIG. 13 is a simplified flow chart showing an exemplary P picture encoding procedure in the encoder, according to one embodiment of the present disclosure. An input frame is captured and digitized into a YUV frame, YCbCr frame, or a frame of any other suitable format. Each component of the input frame is sub-sampled, and corresponding sub-sampled frame-components are combined to form a set of lower resolution sub-sampled frames. The sub-sampled frames are fed to an encoder. The encoder encodes the first sub-sampled frame of the set as a first P picture using inter-set mode, i.e., by means of motion compensated prediction with respect to the first I and/or P picture(s) of previously encoded set(s). The encoder encodes the rest of the sub-sampled frames as P pictures using motion compensated prediction with respect to the first P picture of the current set or another previously coded sub-sampled picture of the current set and/or a previous set. In one embodiment of the disclosure, the first and the sub-sequent sub-sampled frames are encoded according to the H.264/AVC standard.

Figure 14:
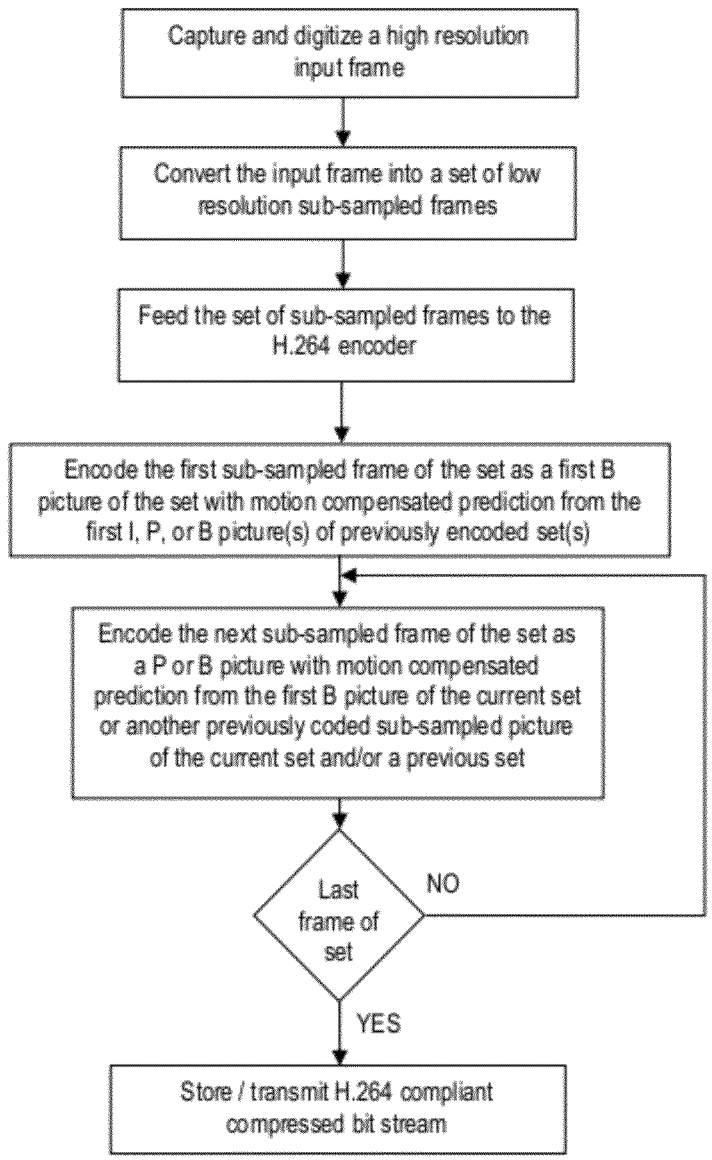
FIG. 14 shows a simplified flow diagram showing B picture encoding in a H.264 encoder, according to one embodiment of the present disclosure.

FIG. 14 is a simplified flow chart of an exemplary B picture encoding procedure performed in the encoder, according to one embodiment of the present disclosure. An input frame is captured and digitized into a YUV frame, YCbCr frame, or a frame of any other suitable format. Each component of the input frame is sub-sampled, and corresponding sub-sampled frame-components are combined to form a set of lower resolution sub-sampled frames. The sub-sampled frames are fed to an encoder. The encoder encodes the first sub-sampled frame of the set as a first B picture using inter-set mode, i.e., by means of bi-directional motion compensated prediction with respect to the first I, P, or B picture(s) of previously encoded set(s). The encoder encodes the rest of the sub-sampled frames as P or B pictures using motion compensated prediction with respect to the first B picture of the current set or another previously coded sub-sampled picture of the current set and/or a previous set. In one embodiment of the disclosure, the first and the sub-sequent sub-sampled frames are encoded according to the H.264/AVC standard.

Figure 15:
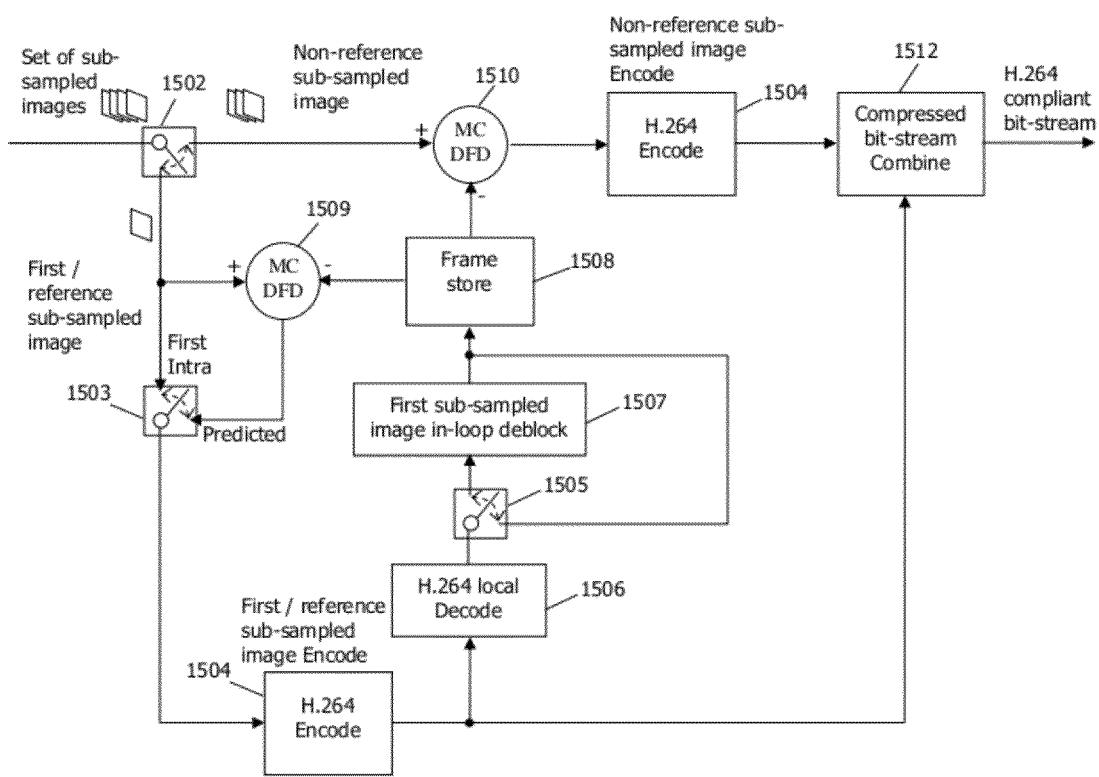
FIG. 15 is a simplified block diagram of a H.264-compliant encoder, according to one embodiment of the present disclosure.

FIG. 15 is a block diagram of an exemplary encoder compliant to the H.264 standard, according to one embodiment of the present disclosure. It is understood that the blocks shown in FIG. 15 may be implemented by software or microcode executed by a data processor or a computer, or one or more hardware circuits, or any combinations thereof. Sets of sub-sampled frames are fed to the encoder, which includes an input switch 1502 that feeds a reference sub-sampled frame of a set, such as the first frame of a set, and a non-reference sub-sampled frame of a set, into appropriate processing elements. A reference frame may be used to form motion compensated predictions for future frames while a non-reference frame is not used to form future predictions. The reference frame of a set is encoded as I, P, or B picture in H.264/AVC format in an H.264 encode unit 1504. The input to the H.264 encode unit 1504 is either a sub-sampled image for Intra picture coding or a motion compensated prediction of a sub-sampled image for Inter predictive coding. Depending upon the choice of the encoding algorithm a switch 1503 selects a direct sub-sampled image signal or a motion compensated displaced frame difference (MCDFD) signal from the frame differencing (MCDFD) unit 1509. In one embodiment, only the first image of a set is coded as an Intra picture. The reference picture is reconstructed in a processing unit 1506 and optionally processed by the in-loop deblock unit 1507 before being stored in a Frame store unit 1508 for future reference. In another embodiment, only the first image of a set is processed by the in-loop deblock unit 1507. Each subsequent non-reference frame of a set is passed on to a motion compensated displaced frame differencing (MCDFD) unit 1510, where it is predicted with respect to a stored frame, using either pre-defined motion vectors or motion vectors that are computed through a motion estimation process. The predicted difference-frame is then encoded in H.264/AVC format in an H.264 encode unit 1504 as a P or B picture. The compressed data of the reference frame(s) and the non-reference frame(s) in a set are combined together in unit 1512 according to the H.264/AVC format to form a compressed bit-stream, and the resultant bit-stream is stored and/or transmitted. Under this operation, only the reference sub-sampled frame of a set needs to be decoded and reconstructed. Additionally, except for the first sub-sampled frame, the entire motion vector data of all subsequent sub-sampled frames in a set may be pre-determined, and hence the need for motion estimation is eliminated. The above holds not just for intra-set motion vectors but for inter-set motion vectors as well, since motion vectors of an inter-set predicted first frame with respect to another first frame of a previous set can be re-used by another frame of the set. These benefits translate into massive reduction in computational complexity of the encoding process. According to one embodiment of the present disclosure, the reference and non-reference sub-sampled portions of an image are encoded by the video encoder using different quantization factors, whereby the quantization factors of the non-reference sub-sampled portions of an image are raised higher than the quantization factors of the reference sub-sampled portions, to meet the bit rate requirements of the encoded video stream.

Figure 16:
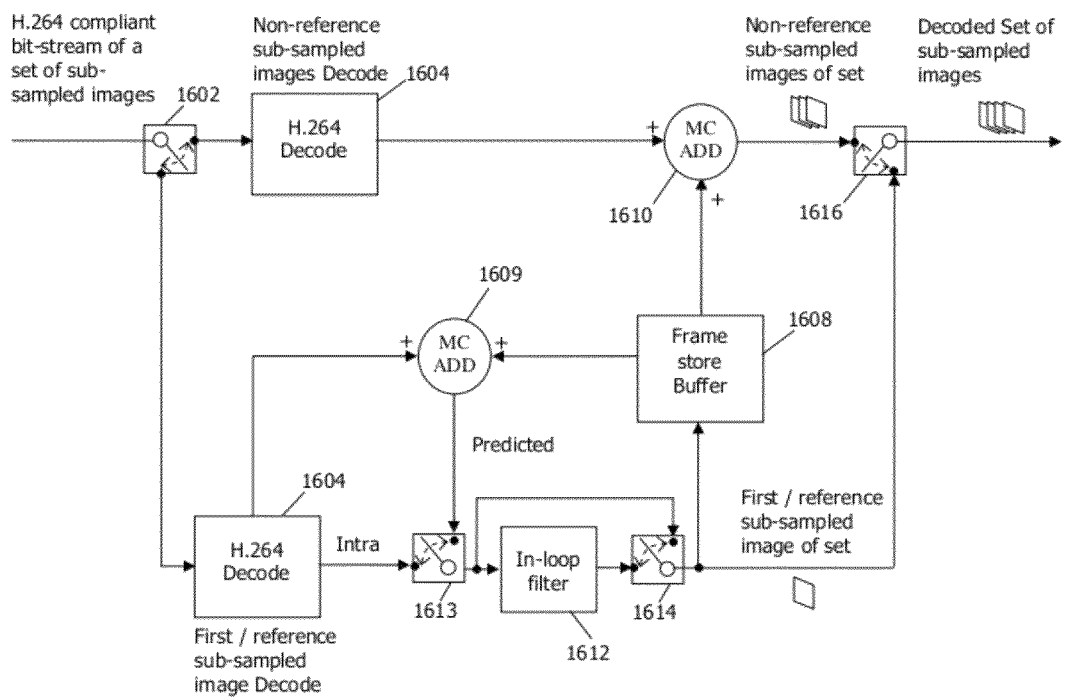
FIG. 16 is a simplified block diagram of a H.264-compliant decoder, according to one embodiment of the present disclosure.

FIG. 16 is a simplified block diagram of an exemplary H.264 compliant decoder, according to one embodiment of the present disclosure. It is understood that the blocks shown in FIG. 16 may be implemented by software or microcode executed by a data processor or a computer, or one or more hardware circuits, or any combinations thereof. Compressed bit-stream from sets of sub-sampled frames is fed to the decoder. The decoder includes an input switch 1602 that feeds portions of the bit-stream corresponding to a reference sub-sampled frame of a set and a non-reference sub-sampled frame of a set into appropriate processing elements. A reference frame may be used to form motion compensated predictions for future frames while a non-reference frame is not used to form future predictions. The bit-stream portion of a reference sub-sampled I, P, or B frame of a set is decoded in H.264 decode unit 1604 and, as signaled in the bit-stream, is optionally processed in an in-loop deblock filter unit 1612 before being stored in a frame store unit 1608 for future reference. The decode unit 1604 decodes the motion vector information of the frame if present in the bit-stream and performs entropy decoding of the texture data. Depending upon the Intra or Inter prediction type of an image, a switch 1613 either passes the decoded data directly for further processing (I picture), or adds a motion compensated prediction data from motion compensation unit 1609 to the residual decoded data (P, B picture), before processing the data further. On the other hand, the portion of bit-stream corresponding to each non-reference frame is passed on to a decode unit 1604 that decodes the motion vector information of the frame if present in the bit-stream and performs entropy decoding of the texture residual data. In the motion compensation unit 1610, the residual data of a non-reference frame of a set is added to prediction data stored in the frame store buffer 1608. The reconstructed data of a non-reference frame of a set is passed out as a P or B picture. In one embodiment, a decoder does not apply in-loop deblock filter to a non-reference sub-sampled frame without causing propagation of mismatch errors. The decoded reference and non-reference frames of a set are then reordered through a switch 1616 and conveyed for rearrangement and display. According to one embodiment of the present disclosure, the video decoder decides not to decode the non-reference sub-sampled portions of an image in order to meet the computational load requirements of the video decoding hardware, without affecting the continuity and integrity of the video stream.

Figure 17:
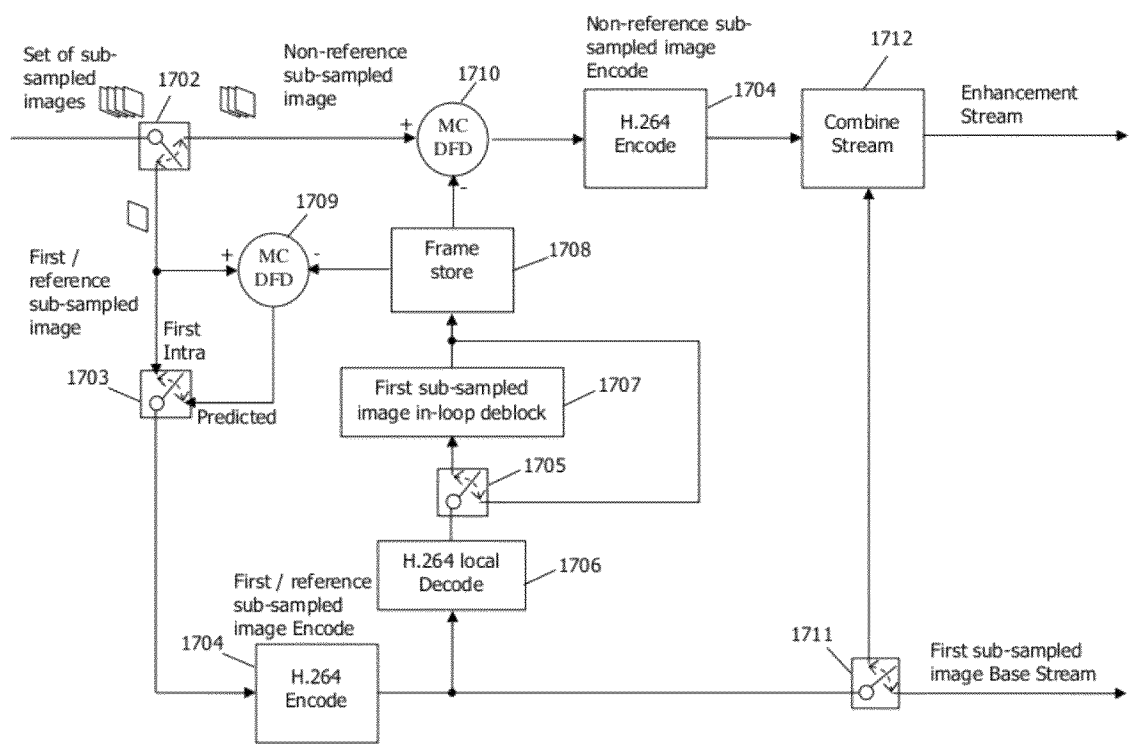
FIG. 17 is a simplified block diagram of a spatially scalable H.264-compliant encoder, according to one embodiment of the present disclosure.

FIG. 17 depicts a simplified block diagram of another embodiment of an exemplary spatially scalable H.264 compliant encoder. It is understood that the blocks shown in FIG. 17 may be implemented by software or microcode executed by a data processor or a computer, or one or more hardware circuits, or any combinations thereof. The spatially scalable encoder does not require up-scaling of the base layer for predictive encoding of the enhancement layer. The spatially scalable encoder of FIG. 17 is similar to the encoder of FIG. 15 except for the fact that this encoder does not necessarily combine the bit-streams of the first and subsequent sub-sampled images of a set. Rather, the encoder shown in FIG. 17 outputs the two portions of the compressed stream as two layers, a base layer and an enhancement layer. Compressed stream of the first sub-sampled image of a set represents the base layer, while the enhancement layer comprises all subsequent sub-sampled images of the set that are coded as P or B pictures predicted from the base layer images or other images of the enhancement layer through motion compensated prediction. The base layer images are encoded as I pictures or as P or B pictures through motion compensated prediction from other base layer images only. Without affecting the integrity of the video stream, a decoding process may choose to decode just the base layer, the base layer and some portions of the enhancement layer, or the base layer and the entire enhancement layer. It is understood that an architecture having more than two spatial layers is also possible and falls within the scope of the present disclosure.

Figure 18:
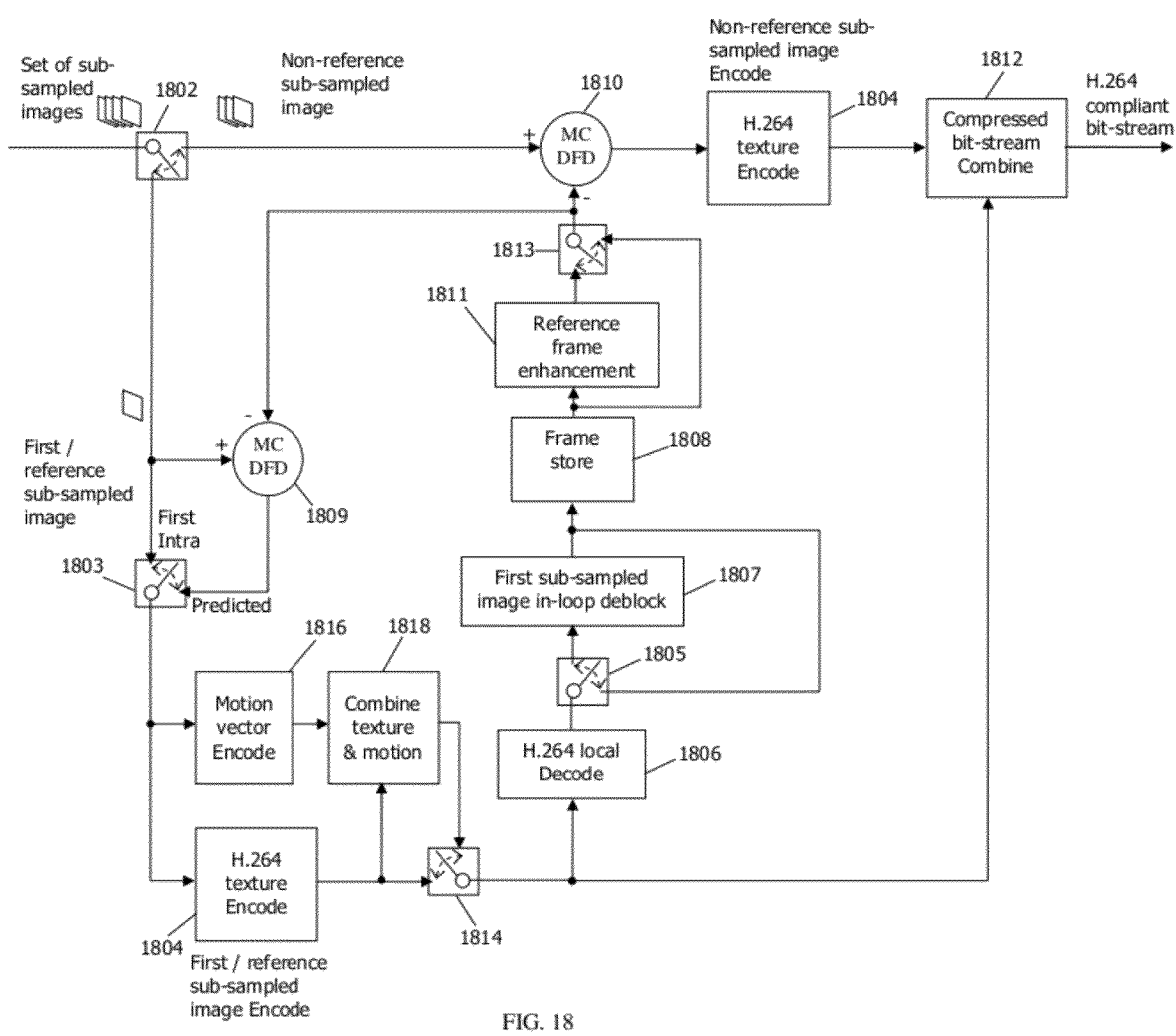
FIG. 18 depicts a simplified block diagram of an H.264 encoder with proprietary enhancements, according to one embodiment of the present disclosure.

According to still another embodiment of this disclosure, proprietary extensions to H.264 encoding and decoding processes are utilized for further improvement in coding efficiency. FIG. 18 is a simplified block diagram of an exemplary H.264 encoder with proprietary enhancements. It is understood that the blocks shown in FIG. 18 may be implemented by software or microcode executed by a data processor or a computer, or one or more hardware circuits, or any combinations thereof. The encoder of FIG. 18 is substantially similar to the encoder shown in FIG. 15, but differs from that of FIG. 15 in two aspects. Firstly, according to one embodiment the encoder of FIG. 18 optionally modifies the reconstructed reference sub-sampled frame of a set in an enhancement unit 1811, prior to its use as a prediction frame in motion compensated prediction. In one embodiment, enhancement of reference sub-sampled frame is carried out through one or more techniques including spatial directional interpolation, spatial filtering or sharpening, to improve the quality of motion compensated prediction and reduce the residual errors while encoding the subsequent reference and/or non-reference frames of a set. Secondly, since the intra-set motion vectors of images in a set may be generated within the decoder, and the inter-set motion vectors of certain frames may be reused by other frames, the encoder of FIG. 18 does not encode this motion vector data. Hence, only texture data is encoded in processing unit 1804 for certain frames in a set. In a different embodiment of the disclosure, an encoder may decide to send one constant fixed motion vector per frame cheaply in place of intra-set motion vectors.

Figure 19:
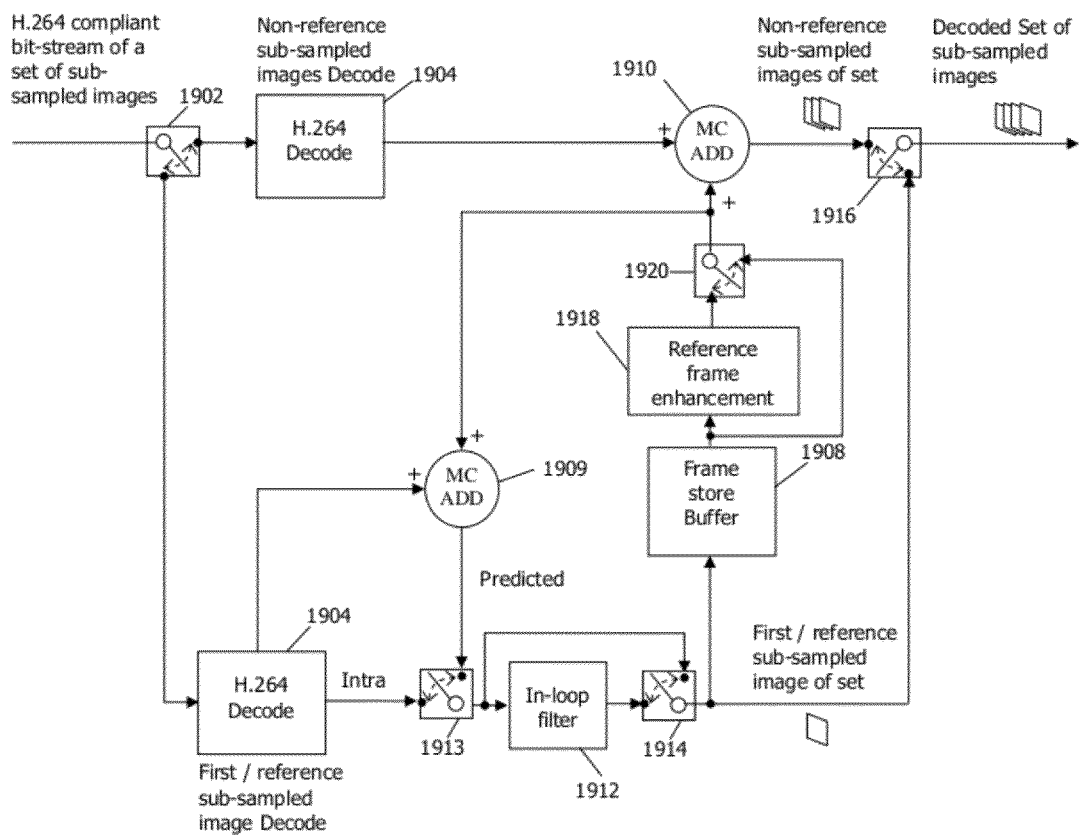
FIG. 19 is a simplified block diagram of a H.264 decoder configured to decode video streams with proprietary enhancements, according to one embodiment of the present disclosure.

FIG. 19 is a simplified block diagram of an exemplary decoder that complements the encoder of FIG. 18, according to one embodiment of the present disclosure. It is understood that the blocks shown in FIG. 19 may be implemented by software or microcode executed by a data processor or a computer, or one or more hardware circuits, or any combinations thereof. The decoder of FIG. 19 is substantially similar to the decoder shown in FIG. 16, but differs from the decoder of FIG. 16 in two aspects. Firstly, the decoder of FIG. 19 enhances a reconstructed reference sub-sampled frame of a set in an enhancement unit 1918, prior to its use as a prediction frame in motion compensated prediction, using an enhancement technique that is identical to that used in the encoder of FIG. 18. Secondly, the decoder of FIG. 19 is configured to decode texture only data for certain sub-sampled frames of a set in unit 1904, while motion vector data is either inferred from the nature and/or order of sub-sampling involved, reused from a previous frame, or received as one fixed motion vector per frame in the stream.

Figure 20:
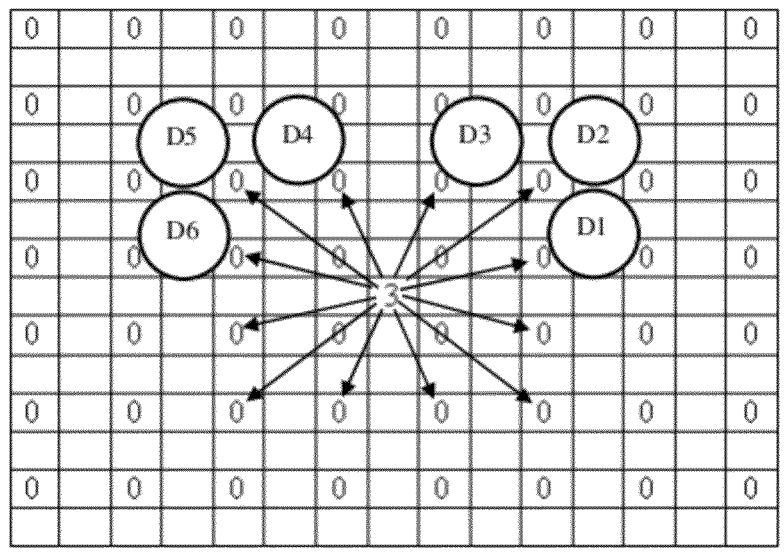
FIG. 20 depicts enhancement technique based upon spatial directional interpolation to improve the quality of a reference sub-sampled frame that is used to predict pixels of another sub-sampled frame.
Figure 20:
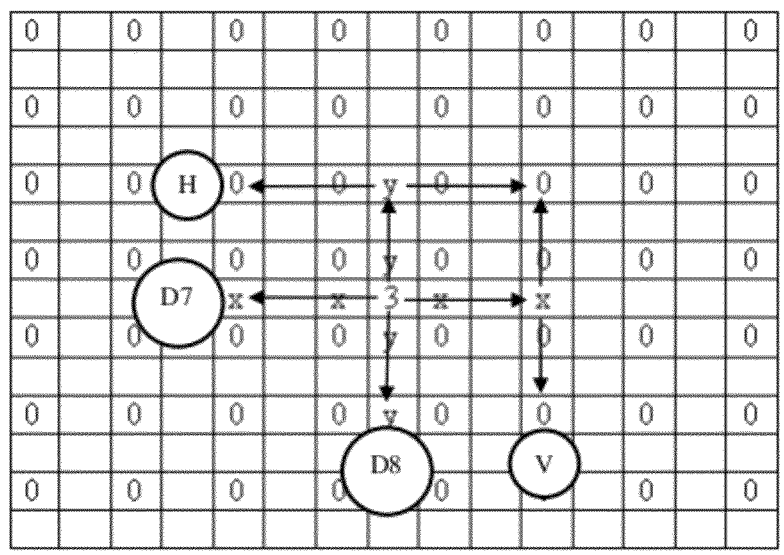
Figure 21:
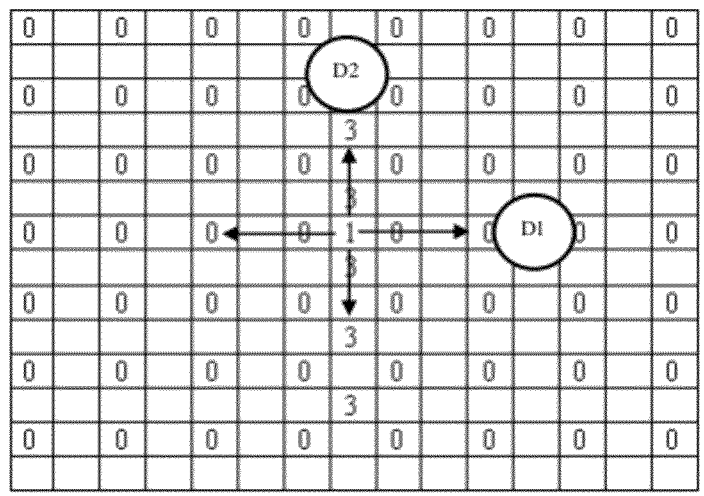
FIG. 21 depicts enhancement technique based upon spatial directional interpolation to improve the quality of a reference sub-sampled frame that is used to predict pixels of another sub-sampled frame.
Figure 22:
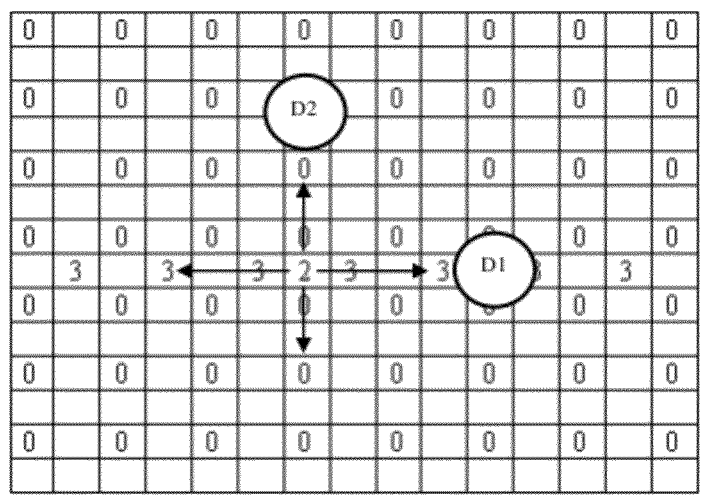
FIG. 22 depicts enhancement technique based upon spatial directional interpolation to improve the quality of a reference sub-sampled frame that is used to predict pixels of another sub-sampled frame.

FIGS. 20, 21 and 22 show enhancement techniques employed in the encoder of FIG. 18 and decoder of FIG. 19 to improve the quality of a reconstructed reference sub-sampled frame, in order to reduce prediction errors in motion compensated prediction process. FIG. 20 A and FIG. 20 B depict directional spatial interpolation process performed at a pixel level by the enhancement units 1811 and 1918 in FIG. 18 and FIG. 19, respectively, for motion compensated prediction of sub-sampled frames, according to one embodiment of the present disclosure. FIG. 20 A and FIG. 20 B have pixels marked according to one possible sub-sampling arrangement wherein pixels in sub-sampled frame 3 are predicted from pixels in sub-sampled frame 0. Based upon spatial gradient information of sub-sampled frame 0, the enhancement units 1811 and 1918 select for each pixel of sub-sampled frame 3 the best prediction direction out of eight prediction directions D1 to D8. Pixels of sub-sampled frame 0 that fall in the selected direction are interpolated to generate a pixel value that is used to predict a corresponding pixel of sub-sampled frame 3. As shown in FIG. 20 B it may be noted that for prediction direction D7 additional work is performed to first generate intermediate pixels marked 'x' by vertically interpolating the pixels of sub-sampled frame 0. The final interpolated pixel value is then generated by interpolating the pixels marked 'x'. Likewise, for prediction direction D8 additional work is performed to first generate intermediate pixels marked 'y' by horizontally interpolating the pixels of sub-sampled frame 0. The final interpolated pixel value is then generated by interpolating the pixels marked 'y'. FIG. 21 has pixels marked according to one possible sub-sampling arrangement wherein pixels in sub-sampled frame 1 are predicted from pixels in sub-sampled frame 0. Based upon spatial gradient information of sub-sampled frame 0, the enhancement units 1811 and 1918 select for each pixel of sub-sampled frame 1 the best prediction direction out of two prediction directions D1 to D2. Depending upon the selected prediction direction, pixels of sub-sampled frame 0 or the above generated pixel values for prediction of sub-sampled frame 3, that fall in the selected direction are interpolated to generate a pixel value that is used to predict a corresponding pixel of sub-sampled frame 1. FIG. 22 has pixels marked according to one possible sub-sampling arrangement wherein pixels in sub-sampled frame 2 are predicted from pixels in sub-sampled frame 0. Based upon spatial gradient information of sub-sampled frame 0, the enhancement units 1811 and 1918 select for each pixel of sub-sampled frame 2 the best prediction direction out of two prediction directions D1 to D2. Depending upon the selected prediction direction, pixels of sub-sampled frame 0 or the above generated pixel values for prediction of sub-sampled frame 3, that fall in the selected direction are interpolated to generate a pixel value that is used to predict a corresponding pixel of sub-sampled frame 2. It is important to note that FIGS. 20, 21 and 22 disclose a directional spatial interpolation based prediction method where each pixel of an entire sub-sampled frame is predicted independently without the limitation of grouping together pixels in blocks or macro-blocks. It must also be noted here that prediction directions different from the ones depicted in FIGS. 20, 21 and 22 are possible. The scope of the present disclosure is not limited by type of directional prediction or interpolation method employed. Such modifications are different manifestations of the present disclosure and fall within its scope.

The present disclosure mainly pertains to the H.264/AVC standard. However, the concept of sub-sampling images and forming motion compensated predictions between sub-sampled images can be easily extended to other video or image compression algorithms that support method for encoding and decoding reference and non-reference frames in a multiple reference frame encoding setup. Hence, the type of video or image compression algorithm being used does not limit the scope of the present disclosure. Encoders are usually preceded by image pre-processing stages and decoders are usually followed by image post-processing stages. The use of pre-processing or post processing stages does not limit the scope of the present disclosure. The sub-sampling of images at the encoding end can be made part of a pre-processing stage, while the rearrangement of images at the decoding end can be made part of a post-processing stage. Moreover, various proprietary sub-sampling/prediction schemes can be used within the scope of the present disclosure. For example, a sub-sampled image may be used to predict another sub-sampled image of the same set; the two can then be combined together to form predictions for other sub-sampled frames. Such modifications are different manifestations of the present disclosure and fall within its scope. Furthermore, the present disclosure has been described from the point of view of progressive image encoding and decoding. However, extension of the methods revealed by the present disclosure to interlaced image encoding and decoding is possible. The type or format of images, therefore, does not limit the scope of the disclosure.

The disclosure has been described in a way that the first sub-sampled frame of a set is predicted using inter-set prediction, while the remaining sub-sampled frames are predicted using inter-set and/or intra-set predictions. It is understood that any sub-sampled frame of a set may be predicted using other approaches, such as inter-set or intra-set predictions. Also, predictions in inter-set and intra-set modes can be made from any frame of a set and not just the first frame. Other embodiments of the disclosure may incorporate multiple reference frames for unidirectional and/or bidirectional predictions in inter-set and intra-set modes.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein.

What is claimed is:

1. A method for encoding video image data or still image data comprising:
    generating a set of sub-sampled images from at least one input image;
    mapping a sub-sampled image or a portion of the sub-sampled image of the input image as a reference sub-sampled frame or a non-reference sub-sampled frame within a video encoding framework that supports methods for encoding reference and non-reference frames;
    enhancing an encoded reference sub-sampled frame using filtering techniques, prior to using the reference sub-sampled frame as a predictor for other sub-sampled frames, where the filtering techniques include:
  selecting pixel prediction directions on the basis of spatial gradient information and sub-sampling pattern, and
  generating motion compensated prediction data using directional spatial interpolation of pixels of the reference sub-sampled frame, where prediction data of each pixel is generated independently without the limitation of grouping together pixels in blocks or macro-blocks:
encoding a sub-sampled frame of the input image by predicting the sub-sampled frame from at least one reference sub-sampled frame using the motion compensated prediction data produced by the filtering techniques; and
generating the encoded image data based on a result of encoding the sub-sampled frames of the input image.

2. The method of claim 1, wherein:
the sub-sampled image in the set of the sub-sampled images is encoded as an Intra (I) frame, or a Predicted (P) frame, or a Bi-directionally predicted (B) frame, using the motion compensated prediction
from at least one sub-sampled image of the same set of the sub-sampled images or another set of the sub-sampled images.

3. The method of claim 1, wherein:
motion vector data is utilized to predict a segment of the sub-sampled image in the set of the sub-sampled images from another sub-sampled image in the same set, and
the motion vector data comprises pre-determined motion vectors that are selected on the basis of sub-sampling pattern of the sub-sampled image, without performing motion estimation.

4. The method of claim 1, wherein:
motion vector data is utilized to predict a segment of the sub-sampled image in the set of the sub-sampled images from a sub-sampled image in the same set or in another set, and
the motion vector data is obtained by re-using motion vectors of a previously coded sub-sampled image in the set, without motion estimation.

5. The method of claim 1, wherein:
motion vector data is utilized to predict a segment of the sub-sampled image in the set of the sub-sampled images from a sub-sampled image in the same set or in another set, and
the motion vector data is obtained by refining motion vectors of a previously coded sub-sampled image in the set, using a motion estimation process.

6. The method of claim 1, wherein only the reference sub-sampled image in the set is reconstructed through a local decoding process.

7. The method of claim 1, wherein the in-loop deblocking filter process is bypassed for one or more sub-sampled images in the set of sub-sampled images.

8. The method of claim 1, wherein motion vector data to predict a segment of the sub-sampled image in the set from another sub-sampled image in the same set, is not encoded.

9. The method of claim 1, wherein motion vector data to predict a segment of the sub-sampled image in the set from another sub-sampled image in another set, is not encoded.

10. The method of claim 1 further comprising generating a spatially scalable multiple-layered bit stream in which one sub-sampled image of the set is encoded as a base layer, and the remaining sub-sampled images of the same set are encoded as one or more enhancement layers.

11. The method of claim 1 further comprising generating a spatially scalable multiple-layered bit stream in which a base layer frame is used as a predictor for one or more enhancement layer frames, without scaling up the base layer frame.

12. The method of claim 1, wherein the at least one input image includes progressive frames or interlaced fields.

13. The method of claim 1, where one of the at least one input image is compatible with at least one of YUV format, YCbCr format and RGB format.

14. The method of claim 1, wherein the generating of the set of sub-sampled images for each of the at least one input image is performed within or outside an encoder.

15. The method of claim 1 further comprising selecting one or more motion compensated predictors for a segment of a sub-sampled image at a picture, slice, or macroblock level.

16. A method for decoding video image data or still image data comprising:
mapping a decoded sub-sampled image in a set of sub-sampled images of an output image as a reference sub-sampled frame or a non-reference sub-sampled frame within a video decoding framework that supports methods for decoding reference and non-reference frames;
enhancing a decoded reference sub-sampled frame using filtering techniques, prior to using the reference sub-sampled frame as a predictor for other decoded sub-sampled frames, where the filtering techniques include:
  selecting pixel prediction directions on the basis of spatial gradient information and sub-sampling pattern, and
  generating motion compensated prediction data using directional spatial interpolation of pixels of the reference sub-sampled frame, where prediction data of each pixel is generated independently without the limitation of grouping together pixels in blocks or macro-blocks;
decoding a bit stream corresponding to a sub-sampled frame of the output image by predicting the decoded sub-sampled frame data from at least one reference sub-sampled frame using the motion compensated prediction data produced by the filtering techniques; and
generating an output image by rearranging the decoded sub-sampled images of one of the at least one output image.

17. The method of claim 16, wherein the decoding process selectively decodes one or more sub-sampled images in the set of sub-sampled images without affecting the integrity of the video stream.

18. The method of claim 16, wherein:
motion vector data is utilized to predict a segment of the sub-sampled image in the set of sub-sampled images from another sub-sampled image in the same set; and
the motion vector data is generated by taking into account a type of sub-sampling and a sub-sampling order.

19. The method of claim 16, wherein:
motion vector data is utilized to predict a segment of the sub-sampled image in the set of sub-sampled images from another sub-sampled image in the same set or in another set; and
the motion vector data is obtained from a previously decoded sub-sampled image in the same set.

20. The method of claim 16 further comprising generating an output image by rearranging the set of sub-sampled decoded images within or outside a decoder.

21. The method of claim 16, wherein a decoder is provided to selectively bypass an in-loop deblocking filter module without propagation of mismatch errors.

* * * * *